US006462131B1

(12) United States Patent
Tse et al.

(10) Patent No.: US 6,462,131 B1
(45) Date of Patent: Oct. 8, 2002

(54) POLYMER BLEND COMPATIBILIZATION USING ISOBUTYLENE-BASED BLOCK COPOLYMERS

(75) Inventors: Mun Fu Tse, Seabrook, TX (US); Hsien Chang Wang, Bellaire, TX (US); Ramanan Krishnamoorti, Houston, TX (US); Andy H. Tsou, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/688,425

(22) Filed: Oct. 16, 2000

(51) Int. Cl.$^7$ ............................. C08L 53/00; C08L 55/00
(52) U.S. Cl. .............................. 525/70; 525/87; 525/88; 525/95; 525/98; 525/99
(58) Field of Search ............................. 525/95, 70, 87, 525/88, 98, 99

(56) References Cited

U.S. PATENT DOCUMENTS

| | | |
|---|---|---|
| 4,946,899 | 8/1990 | Kennedy et al. |
| 5,162,445 | 11/1992 | Powers et al. |
| 5,346,964 | 9/1994 | Shibata et al. |
| 5,352,744 | 10/1994 | Bates et al. |
| 5,451,647 | 9/1995 | Faust et al. |
| 5,506,316 | 4/1996 | Shaffer et al. |
| 5,741,859 | 4/1998 | Saxena et al. |

FOREIGN PATENT DOCUMENTS

| | | |
|---|---|---|
| EP | 0 691 378 A2 | 1/1996 |
| WO | WO 91/07451 A | 5/1991 |
| WO | WO 98/52994 * | 11/1998 |

OTHER PUBLICATIONS

H.C. Wang and K. W. Powers, "Functionalized PMS/IB Copolymers Offer Wide Range of Properties", (1992) Elastomerics.

Edward Kresge and H. C. Wang, "Butyl Rubber", Kirk–Othmer Encyclopedia of Chemical Technology—Fourth ed., vol. 8, (1993).

"Physical Properties of Isobutylene Based Block Copolymers", M.F. Tse, H. C. Wang, T. D. Shaffer, K. O. Mcelrath, M.A. Modi and R. Krishnamoorti (1997).

J.P. Kennedy, N. Meguriya, and B. Keszler, "Polyisobutylene–Containing Block Copolymers by Sequential Monomer Addition. 5.", Macromolecules, vol. 24, No. 25, (1991).

J.E. Puskas, G. Kaszas, J.P. Kennedy, and W.G. Hager, "Polyisobutylene–Containing Block Polymers by Sequential Monomer Addition. IV. New Triblock Thermoplastic Elastomers Comprising High $T_g$ Styrenic Glassy Segments: Synthesis, Characterization and Physical Properties", Polyisobutylene Block Polymers, pp. 41–48 (1991).

L. J. Fetters, E.M. Firer, and M. Dafauti, "Synthesis and Properties of Block Copolymers", Macromolecules, vol. 10, No. 6, Nov.–Dec. 1977, pp. 1200–1207.

M.M. Sheridan, J.M. Hoover, T.C. Ward, and J.E. McGrath, "Viscoelastic Properties of Radial Substituted Styrene–Isoprene Block Copolymers", Polym. Prepr. 25(2), pp. 102–104 (1984).

M.M. Sheridan, J.M. Hoover, T.C. Ward, and J.E. McGrath, "Role of Microphase Separation in Adhesion", 26(1), pp. 186–188, (1985).

J.E. McGrath, R.D. Allen, J.M. Hoover, T.E. Long, A.D. Broske, S.D. Smith and D.K. Mohanty, "Synthesis of Multiphase Copolymers via Anionic Polymerization", Polym. Prepr. 27(1), pp. 183–185, (1986).

Kennedy et al., Polym. Meter. Scie. Eng., 63, p. 371–375, (1990).

* cited by examiner

Primary Examiner—Jeffrey Mullis
(74) Attorney, Agent, or Firm—Kevin M. Faulkner; Charles E. Runyan

(57) ABSTRACT

Compatibilized blends of an isobutylene polymer and an unsaturated diene polymer are prepared by utilizing a compatibilizing agent comprising a block/graft copolymer containing polyisobutylene segments and $C_4$ to $C_6$ alkyl-substituted styrene polymer segments, such as poly(t-butylstyrene) segments.

37 Claims, 3 Drawing Sheets

POLYMER BLEND COMPATIBILIZATION USING ISOBUTYLENE-BASED BLOCK COPOLYMERS

FIELD OF THE INVENTION

The present invention relates to compatibilized blends comprising high and low unsaturation elastomers.

DESCRIPTION OF RELATED ART

Vulcanizates based on blends of elastomers which contain little or no olefinic unsaturation with more highly unsaturated elastomers are of interest in the rubber industry primarily because of their special properties, e.g., superior resistance to ozone degradation and consequent cracking, improved resistance to chemical attack, improved temperature stability and unique dynamic response. These blends can permit the achieving of synergisms wherein the composite blend possesses combinations of properties unattainable in the individual elastomers. However, these desirable properties can be realized only when an intimate homogeneous blend of the elastomers with phase sizes of less than 5 microns, generally 1 micron or less, is produced and maintained in the blend and a satisfactory level of interfacial adhesion is achieved.

Unfortunately, it is generally known that most polymers are not compatible with one another unless specific favorable interactions are present because the favorable entropy of mixing is too small to overcome the unfavorable enthalpy of mixing, thus making the free energy of mixing unfavorable. Blends produced by normal techniques are grossly inhomogeneous with phase sizes many microns in diameter. This gross incompatibility of the individual polymers with a consequent inability to produce and maintain the homogeneous fine phase sizes required in synergistic blends is particularly evidenced when the individual polymers differ considerably in solubility parameters as is the case when attempts are made to blend low unsaturation elastomers with the more highly unsaturated elastomers.

A further problem with mixtures of saturated and unsaturated elastomers is that, even if intimate dispersions can be produced during high shear mixing operations, the mixtures phase-separate when the mixing is stopped so that the final blends are grossly inhomogeneous with the individual phase sizes many microns in diameter. These grossly inhomogeneous blends generally have very poor combinations of properties, usually much worse than the individual polymers, rather than displaying the desirable synergistic combination of properties obtainable in the more intimate homogeneous blends of phase sizes less than 5 microns, preferably 1 micron or less.

One approach towards compatibilizations of non-compatible polymers is to include in the blend a block copolymer which contains one chain segment derived from monomers compatible with one blend polymer and another chain segment derived from monomers compatible with the other blend polymer. For example, EP691378A discloses polymer blends comprising a polycarbonate resin and polyisobutylene which are compatibilized by including a minor amount of a polycarbonate-polyisobutylene block copolymer in the blend composition. In addition, U.S. Pat. No. 5,741,859 discloses block copolymers of polyisobutylene and polydimethylsiloxane and suggests their use as compatibilizers.

Di, tri and radial block copolymers containing polyisobutylene and poly(p-chlorostyrene) are disclosed as compatibilizers by Kennedy et al. in Polym.Mater.Sci.Eng., 63, p 371–375, 1990.

Polymer blends comprising a mixture of an isobutylene polymer and a more highly unsaturated elastomer such as polybutadiene or polyisoprene are extremely interesting because of the potential improvement of such properties as ozone resistance, resistance to chemical attack, resistance to air permeability, and improved temperature stability as described above. But isobutylene polymers such as polyisobutylene, copolymers of isobutylene with isoprene (butyl rubber), copolymers of isobutylene with a para-alkylstyrene and halogenated versions thereof are not very compatible with more highly unsaturated elastomers such as polymers based on conjugated diene monomers. In the absence of specific, strong chemical interactions, two dissimilar polymers of this type have a positive free energy of mixing and hence are thermodynamically incompatible because the heat of mixing is usually positive and the entropy gained upon mixing these dissimilar polymeric molecules is quite small. The result is a high interfacial tension and poor adhesion between the two phases in the blend, and weak blend mechanical properties due to lack of a highly structured morphology. The present invention is directed towards an improved blend of high and low unsaturation elastomers by the incorporation of a block copolymer.

SUMMARY OF THE INVENTION

The invention provides a compatibilized polymer blend comprising:
(a) an isobutylene polymer selected from the group consisting of polyisobutylene, random copolymers of isobutylene with up to about 10 weight % isoprene, halogenated random copolymers of isobutylene with up to about 10 weight % isoprene, random copolymers of isobutylene with up to 20 weight % of a para-alkylstyrene, halogenated random copolymers of isobutylene and up to 20 weight % of a para-alkylstyrene and mixtures thereof;
(b) at least one olefinically unsaturated diene polymer; and
(c) a compatibilizer for components (a) and (b) comprising a block copolymer of at least one recurring polyisobutylene segment and at least one recurring segment comprising a $C_4$ to $C_6$ alkyl ring substituted styrene or ring-substituted alpha-methylstyrene.

The preferred compatibilizer comprises a di, tri or radial block copolymer of polyisobutylene and para-tertiary-butylstyrene (tbS).

The invention also provides for co-vulcanized elastomer compositions based on these blends.

BREIF DESCRIPTION OF THE DRAWINGS

DETAILED DESCRIPTION OF THE INVENTION

Figure 1:
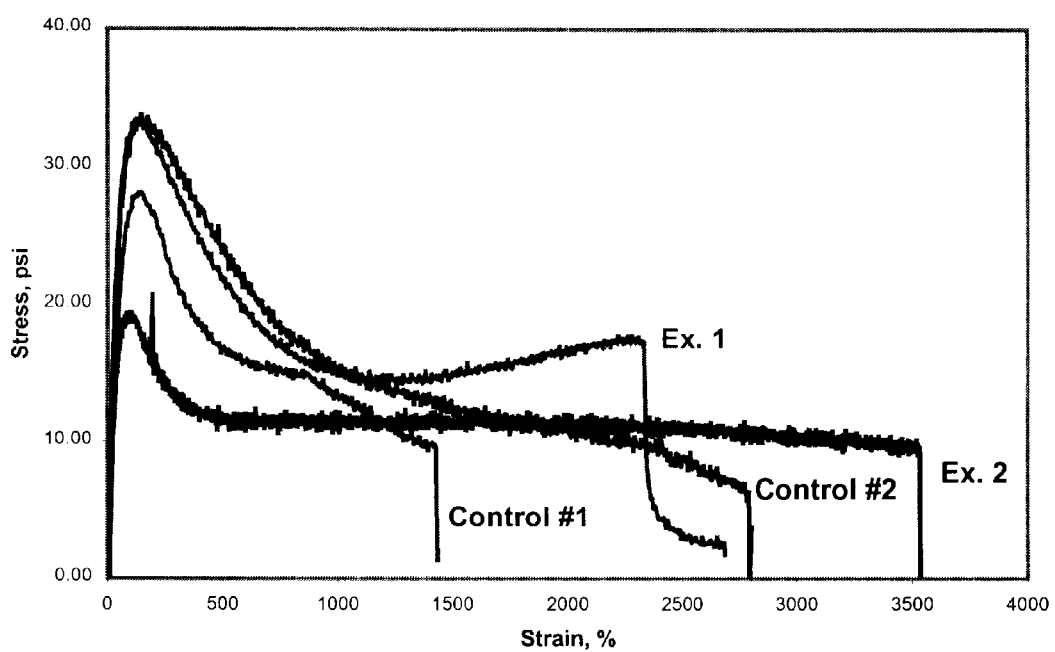
FIG. 1 is a plot of tensile stress-strain measurements of polymer blends prepared in the examples.

The compatibilizer copolymers useful in accordance with this invention may be characterized as block copolymers containing at least one polymer chain segment derived from a $C_4$ to $C_6$ alkyl substituted styrene or alpha-methylstyrene and at least one polymer chain segment derived from isobutylene. These materials may comprise S-iB-S or iB-S-iB triblock copolymers, S-iB diblock copolymers, (S-iB)$_n$ multiblock copolymers, graft copolymers of poly S or a poly iB backbone, or star branched polymers containing poly S and poly iB segments, wherein iB is isobutylene and S is a $C_4$-$C_6$ alkyl substituted styrene or alpha-methylstyrene. For the purposes of this invention, all of these materials will hereinafter be referred to as block/graft copolymers.

The styrenic moiety of the block/graft copolymer comprises one or a mixture of styrene or alpha-methylstyrenes which are ring substituted at the ortho, meta or para position with a linear or branched $C_4$ to $C_6$ alkyl group. The most preferred styrenic monomer is para-t-butylstyrene wherein the alkyl substitute group is —$C(CH_3)_3$.

The more preferred block copolymers have a GPC number average molecular weight in the range of 10,000 to 500,000, and more preferably 50,000 to 200,000, wherein the styrenic monomer segment(s) comprise at least about 10 weight % of the copolymer and the balance of the polymer comprises isobutylene segments. The most preferred block/graft copolymers are S-iB-S or iB-S-iB tri-block copolymers containing about 10–50 weight % of the styrenic block copolymer segments, and preferably containing between about 10 and 30 weight % of the styrenic block copolymer segments.

These block/graft copolymers are well known in the art and are preferably prepared by living carbocationic sequential polymerization using a catalyst comprising an initiator which is a tertiary alkyl halide, a tertiary aralkyl halide or a polymeric halide and a co-initiator which comprises a methyl aluminum or a methyl boron compound. Polymerization is conducted in a suitable solvent such as anhydrous methylene chloride or hexane or mixed solvents and at temperatures below −30° C., preferably below −60° C. These polymerization methods are more completely disclosed in U.S. Pat. Nos. 4,946,899, 5,506,316 and 5,451,647, the complete disclosure of which are incorporated herein by reference.

The polymer blend of the invention is characterized by including at least two components: an olefinically unsaturated diene polymer component and an isobutylene component. The olefinically unsaturated diene polymer component includes elastomeric conjugated diene (diolefin) polymers such as polybutadiene, natural rubber, synthetic polyisoprene, copolymers of butadiene with up to about 40 weight % of styrene or acrylonitrile, polychloroprene, and mixtures thereof. Most preferably, the olefinically unsaturated component is polybutadiene or polyisoprene. The unsaturated polymer may also be non-elastomeric and may include liquid to waxy polybutadiene or butadiene copolymers having a number average molecular weight in the range of about 300 up to 10,000.

The isobutylene polymer component of the blend includes polyisobutylene, random copolymers of isobutylene with up to about 10 weight % of isoprene (butyl rubber), chlorinated or brominated butyl rubber containing from about 0.3 to 3 weight % halogen, random copolymers of isobutylene with up to about 20 weight %, and preferably up to about 14 weight percent % of para-alkylstyrene such as para-methylstyrene (PMS) and chlorinated or brominated iBPMS copolymers containing from about 0.1 to 10 mol % of halomethylstyrene groups. For halogenated iBPMS, the halogen is present as benzylic halogen on the polymer molecules. The iBPMS and halogenated iBPMS copolymers are more particularly described in U.S. Pat. No. 5,162,445, the complete disclosure of which patent is incorporated herein by reference.

Blends of the invention may generally contain the isobutylene polymer and olefinically unsaturated polymer at a respective level in the range of 95–5 parts by weight of isobutylene polymer per 5–95 parts by weight of unsaturated polymer. More preferably, blends of the invention may generally contain the isobutylene polymer and olefinically unsaturated polymer at a respective level in the range of 50–10 parts by weight of isobutylene polymer per 10–50 parts by weight of unsaturated polymer. The block/graft copolymer additive may be present at a level of between about 2 to 20 weight %, more preferably between about 5 to 15 weight %, based on the polymer content of the blend.

It is surprising that the block/graft copolymers containing polyisobutylene and poly(p-tertiary-butylstyrene) segments will compatibilize blends containing highly unsaturated elastomers such as polybutadiene or polyisoprene because the block/graft copolymer does not contain a diene polymer segment. It is unexpected that the styrenic polymer segments serve to compatibilize such elastomeric dienes.

The block/graft copolymers may contain from about 10 to 90 weight % of the styrenic polymer segments, and preferably contains from about 10 to 50 weight % of the styrenic polymer segments, with the balance being polyisobutylene segments. In the case where the block/graft copolymer is a triblock, the styrenic segments may form the outer blocks, e.g., S-iB-S, or the styrenic segments may form the inner block, e.g. iB-S-iB. In compositions containing high amounts of isobutylene polymer blend component, e.g. greater than 65 weight %, iB-S-iB type block/graft copolymers are preferred compatibilizers. For compositions containing higher levels of olefinically unsaturated diene polymer, e.g. greater than 65 weight %, S-iB-S type block/graft copolymers are preferred compatibilizers. More preferred block/graft copolymers contain styrenic polymer segments having a GPC number average molecular weight of at least 5,000, more preferably from about 10,000 to 50,000, and more preferably from about 10,000 to 30,000.

The compatibilized blend composition of the invention is preferably vulcanized and shaped to form useful articles such as tire sidewalls, tire treads, tire carcasses, tire linings, hoses, belts, mechanical goods and like articles.

Suitable methods for vulcanizing or cross linking the composition include exposure to high energy radiation (ultra violet, electron-beam or gamma) or the inclusion of a suitable peroxide or accelerated sulfur vulcanizing system into the elastomer formulation.

Examples of suitable peroxides include dialkyl peroxides, ketal peroxides, aralkylperoxides, peroxyethers and peroxyesters. Preferred peroxides include di-cumylperoxide, di-tert-butylperoxide, benzoyl peroxide, tert-butylperbenzoate and like known free radical generators. The quantity of peroxide generally ranges from about 1 to about 10 parts by weight, preferably from about 1.5 to 6 parts by weight per 100 parts by weight of curable polymer present in the composition.

Accelerated sulfur vulcanization systems which may be used as curatives in the present invention include sulfur or mixtures of sulfur and sulfur-containing accelerators and/or phenol-formaldehyde resins. Suitable accelerators include benzothiazyl disulfide, N-oxydiethylene benzothiazole-2-sulfenamide, 2-mercaptobenzothiazole, alkyl phenol disulfides, alkylthiuram sulfides, m-phenylenebismaleimide, N,N'-diarylguanidines, dialkyl and diaryl-dithiocarbamates, and like materials.

Suitable dialkyldithiocarbamates include the dialkyldithiocarbamates of zinc, bismuth, cadmium, copper, lead, selenium, and tellurium wherein the alkyl group contains from 1 to 5 carbon atoms, piperidinium pentamethylenedithiocarbamate and mixtures thereof.

Suitable diaryldithiocarbamates include the diaryldithiocarbamates of zinc, bismuth, cadmium, copper, lead, selenium, tellurium, and mixtures thereof.

Suitable alkylthiuram sulfides include dipentamethylene thiuram tetrasulfide, tetrabutylthiuram disulfide, tetraethylthiuram disulfide, tetramethylthiuram monosulfide, tetrabenzylthiuram disulfide, and mixtures thereof.

Sulfur and vulcanization accelerators are normally added to the composition at levels in the range of from about 0.5 to about 8 parts by weight based on 100 parts by weight of curable elastomer present in the composition. The accelerated sulfur curing system is preferably used as a cocurative in curing systems also containing zinc oxide or an equivalent thereof, as an auxiliary curative agent. Zinc oxide is normally used in such systems at a level of from about 0.2 to about 7 parts by weight per 100 parts by weight of elastomer.

The elastomer composition may also contain other additives such as scorch retarders, lubricants, fillers, plasticizers, tackifiers, coloring agents, blowing agents, and antioxidants, provided these do not interfere with curing.

Examples of fillers include inorganic fillers such as reinforcing grade carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar type lubricants such as coal tar and coal tar pitch; waxes such as beeswax, carnauba wax and lanolin; and synthetic polymeric substances such as petroleum resins.

Examples of plasticizers include hydrocarbon oils, e.g., paraffin, aromatic and naphthenic oils, phthalic acid esters, adipic acid esters, sebacic acid esters and like plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N-N'-dinitrosopentamethylenetetramine, azocarbonamide, azobisisobutyronitrile, benesulfonyl hydrazide, toluenesulfonyl hydrazide, p-toluenesulfonyl azide, urea, and the like.

The vulcanizable composition may be prepared and blended using solvent blending or any suitable melt-mixing device such as an internal mixer (Brabender Plasticorder), a Banbury Mixer, an extruder, a mill mixer, a kneader or a similar mixing device. Preferred blending temperatures and times in these melt-mixing devices may range from about 100° C. to 200° C. and from about 1 to 15 minutes, respectively. It is preferred that the polymer components be subjected to high shear and/or extensional mixing to form an intimate homogeneous blend having a dispersed phase with a phase size of less than 5 microns, preferably less than 2 microns.

EXAMPLES

The following examples are illustrative of the invention.

The block copolymer used in Examples 1 and 2 was synthesized via living carbocationic polymerization using an aluminum-based initiator. Values of weight % (Wt %) end block and number-average molecular weight, $M_n$, of this triblock copolymer are shown as follow:

| Designation | Wt % End Block | $M_n \times 10^{-3}$ |
| --- | --- | --- |
| 12tbS-80iB-12tbS | 23% tbS | 12-80-12 | where tbS is tertiary-butylstyrene, and iB is isobutylene. As an example, the isobutylene-based polymer used in this invention was a poly(isobutylene-co-4-methylstyrene), abbreviated by PIMS. This copolymer contains 96.25 mol % isobutylene and 3.75 mol % PMS. GPC $M_n$ and $M_w$ are 173,000 and 479,000, respectively. Two diene polymers were used. Budene® 1207 (Goodyear Tire and Rubber Company, Akron Ohio) is a polybutadiene containing approximately 98% cis-1,4 content, and Natsyn® 2200 1207 (Goodyear Tire and Rubber Company, Akron Ohio) is a polyisoprene containing 92% (minimum) cis-1,4 content. Four blends were prepared by mixing in toluene followed by extensive drying in a vacuum oven.

Examples 1 and 2 (Ex. 1 and Ex. 2) in Table 1 (numbers expressed in parts by weight) are blends containing the block copolymer compatibilizer and control examples 1 and 2 (Cont. 1 and Cont. 2) do not.

TABLE 1

|  | Ex. 1 | Ex. 2 | Cont. 1 | Cont. 2 |
| --- | --- | --- | --- | --- |
| PIMS | 7.27 | 7.27 | 8 | 8 |
| Budene ® 1207 | 7.27 | — | 8 | — |
| Natsyn ® 2200 | — | 7.27 | — | 8 |
| tbS-iB-tbS | 1.45 | 1.45 | — | — |
| Irganox ® 1010 | 0.16 | 0.16 | 0.16 | 0.16 |
| Strain at break, % | 2700 | 3500 | 1400 | 2800 |
| Max. Stress near Break, psi | 18 | 10 | 10 | 7 | where Irganox 1010 is a stabilizer (Ciba Geigy).

Figure 2:
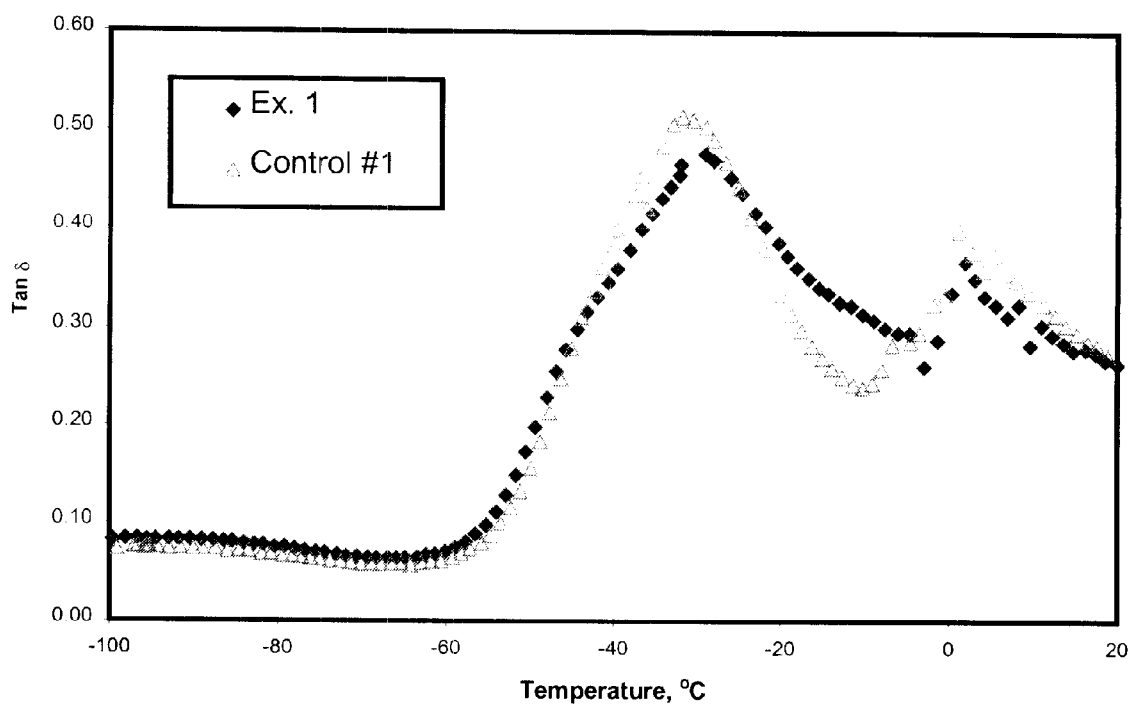
FIG. 2 is a plot of dynamic thermal mechanical measurements of one polymer blend prepared in the examples.
Figure 3:
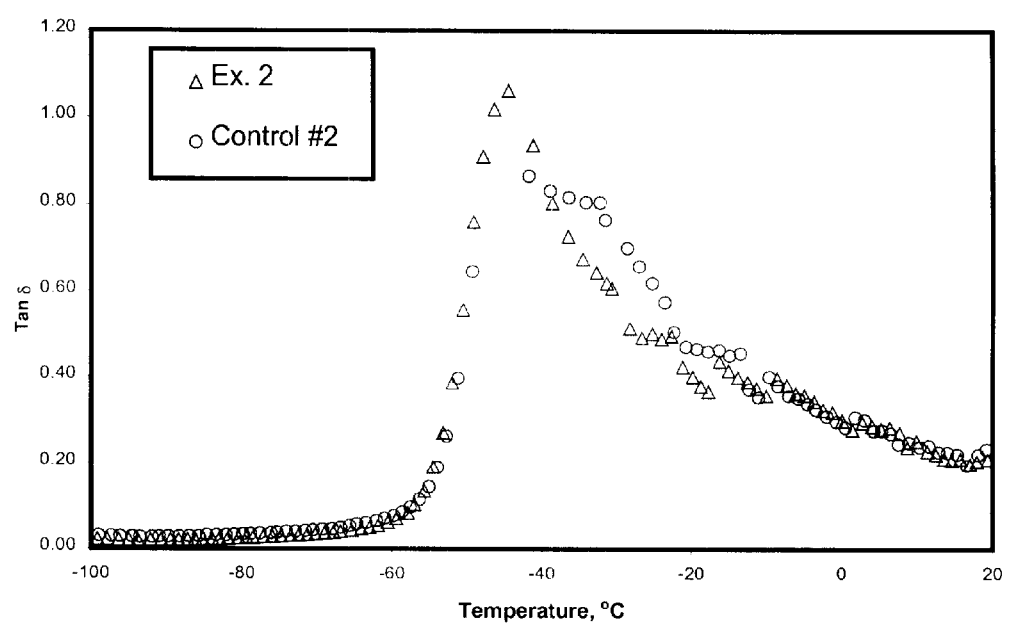
FIG. 3 is another plot of dynamic thermal mechanical measurements of another polymer blend prepared in the examples.

Tensile stress-strain measurements were performed on these four blends using micro-dumbbell specimens at a test temperature of 25° C. and an Instron cross-head speed of 2"/min. As shown by FIG. 1, the incorporation of tbS-iB-tbS into PIMS/Budene® 1207 and PIMS/Natsyn® 2200 blends increases the strain at break and the maximum stress near the break point. Dynamic thermal mechanical measurements using 1 Hz frequency and 2° C./min heating rate were also performed on these four blends to determine how tbS-iB-tbS affects the phase behavior. These measurements are known to those skilled in the art and commonly used. FIGS. 2 and 3 show the loss tangent (δ) as a function of temperature for the PIMS/Budene® 1207 blend and the PIMS/Natsyn® 2200 blend, respectively. The block copolymer forms a diffused interface between PIMS and the diene polymer as indicated by the increased loss tangent values between the two loss tangent peaks (FIG. 2) or by a narrowing of the loss tangent peak (FIG. 3).

Additional blends having the composition shown in Table 2 (numbers expressed in parts by weight) were prepared by melt blending. Several 25/75 by weight blends of PIMS/Budene® 1207 and PIMS/Natsyn® 2200 with and without 12TBS-80iB-12TBS were prepared. This blending was carried out in a Brabender mixer at a temperature of about 180° C. and a rotor speed of about 60 rpm for about 10 minutes. Each composition in Table 2 was compression-molded at about 180° C. for about 30 minutes to make pads of thickness about 0.08". Tensile stress-strain measurements were performed on these molded pads (stored under ambient conditions for 24 hours prior to tests). Micro-dumbbell specimens were used (test temperature 25° C.; Instron cross-head speed 2"/minute, using ASTM DI 708).

Also studied was the morphological change of the blends due to the block copolymer by atomic force microscopy (AFM) measurements. All specimens were AFM analyzed within 8 hours after cryofacing to prevent specimen relaxation. During cryofacing, the specimens were cooled to −150° C. and cut with diamond knives in a cryogenic microtome. They were then stored in a dessicator under flowing dry nitrogen gas to warm up to ambient temperatures without condensation being formed. Finally, the faced specimens were mounted in a miniature steel vice for AFM analysis. The AFM measurements were performed in air using a rectangular Si cantilever. AFM phase images of all specimens were processed and measured to compute sizes/shapes of dispersed phases.

As shown in Table 2, the incorporation of the tbS-iB-tbS polymer in the PIMS/Budene® 1207 blend (Ex. 3) increases the strain at break and the maximum stress near the break point over the control composition 3. The incorporation of tbS-iB-tbS in the PIMS/Natsyn® 2200 blend (Ex. 4) increases the strain at break over the control composition 4.

TABLE 2

|  | Cont. 3 | Cont. 4 | Ex. 3 | Ex. 4 |
| --- | --- | --- | --- | --- |
| PIMS | 4 | 4 | 3.64 | 3.64 |
| Budene 1207 | 12 | — | 10.91 | — |
| Natsyn 2200 | — | 12 | — | 10.91 |
| tbS-iB-tbS | — | — | 1.45 | 1.45 |
| Irganox 1010 | 0.16 | 0.16 | 0.16 | 0.16 |
| Strain at Break, % | 395 | 510 | 560 | 640 |
| Max. Stress near Break, psi | 30 | 2 | 64 | 2 |
| $D_n$, μm | 1.53 | 0.57 | 0.83 | 0.25 |
| $D_w$, μm | 2.17 | 0.91 | 1.24 | 0.32 |
| $D_a$, μm | 2.70 | 1.15 | 1.59 | 0.40 |
| $D_v$, μm | 3.03 | 1.28 | 1.86 | 0.46 |
| F | 0.80 | 0.82 | 0.74 | 0.71 |

$D_n$ = equivalent number-average diameter
$D_w$ = equivalent weight-average diameter
$D_a$ = equivalent area-average diameter
$D_v$ = equivalent volume-average diameter
F = form factor = $4\pi(area)/(perimeter)^2$, a measure of surface irregularities; a smaller F means a higher degree of surface irregularities Using AFM measurements and image analysis (Photoshop® 5.0, Adobe Systems, Inc.), the PIMS minor phase was characterized by various average diameters, $D_n$, $D_w$, $D_a$, and $D_v$. The compatilizing effect of tbS-iB-tbS on the PIMS/Budene® 1207 and PIMS/Natsyn® 2200 blends in reducing the size of the PIMS minor phase is obvious based on the data in Table 2. Also, in the presence of tbS-iB-tbS, the PIMS phase size is reduced more in the PIMS/Natsyn® 2200 blend than in the PIMS/Budene® 1207 blend. This is consistent with the observation that the homopolymer of tbS is more compatible with polyisoprene than with polybutadiene. The observed lowering in form factor in both blends containing tbS-iB-tbS reflects more non-spherical and higher-surface-area PIMS domains. This increase in domain surface area per unit volume indicates a steric stabilization to retard PIMS phase coalescence and/or a reduction in interfacial tension in these blends due to the presence of tbS-iB-tbS compatibilizer.

What is claimed is:

1. A compatibilized polymer blend comprising:
   (a) an isobutylene polymer selected from:
      (i) polyisobutylene;
      (ii) random copolymers of isobutylene with up to about 10 weight % isoprene;
      (iii) halogenated random copolymers of isobutylene with up to about 10 weight % isoprene;
      (iv) random copolymers of isobutylene with up to 20 weight % of a para-alkylstyrene;
      (v) halogenated random copolymers of isobutylene and up to 20 weight % of a para-alkylstyrene; and
      (vi) mixtures thereof;
   (b) at least one olefinically unsaturated diene polymer; and
   (c) a compatibilizer for components (a) and (b) comprising a block/graft copolymer of:
      (i) at least one recurring polyisobutylene segment; and
      (ii) at least one recurring segment consisting essentially of a $C_4$ to $C_6$ alkyl ring substituted styrene or ring-substituted alpha-methylstyrene.

2. The composition of claim 1 wherein said compatibilizer comprises a copolymer of isobutylene and para-t-butylstyrene.

3. The composition of claim 2 wherein said compatibilizer comprises a tbS-iB diblock copolymer or a tbS-iB-tbS or iB-tbS-iB triblock copolymer having a GPC number average molecular weight in the range of about 10,000 to 500,000 which contains at least about 10 weight % of said para-t-butylstyrene.

4. The composition of claim 1 wherein said components (a) and (b) are present in said composition at a level in the range of about 95–5 parts by weight of (a) per 5–95 parts by weight of (b).

5. The composition of claim 4 wherein said compatibilizer is present in said composition at a level of about 2 to 20 weight % based on the polymer content of said blend.

6. The composition of claim 3 wherein said compatibilizer is a tbS-iB diblock or tbS-iB-tbS triblock copolymer having a GPC number average molecular weight of from about 50,000 to up to about 200,000.

7. The composition of claim 1 wherein said isobutylene polymer (a) comprises a copolymer of isobutylene and para-methylstyrene.

8. The composition of claim 7 wherein said isobutylene polymer (a) is a halogenated copolymer of isobutylene and para-methylstyrene containing benzylic chlorine or bromine.

9. The composition of claim 1 wherein said olefinically unsaturated diene polymer is an elastomer selected from the group consisting of polybutadiene, synthetic polyisoprene, natural rubber, elastomeric copolymers of butadiene with styrene or acrylonitrile, polychloroprene, and mixtures thereof.

10. A vulcanized polymer blend of claim 1.

11. A compatibilized polymer blend comprising:
   (a) an isobutylene polymer selected from:
      (i) polyisobutylene;
      (ii) random copolymers of isobutylene with up to about 10 weight % isoprene;
      (iii) halogenated random copolymers of isobutylene with up to about 10 weight % isoprene;
      (iv) random copolymers of isobutylene with up to 20 weight % of a para-methylstyrene;
      (v) halogenated random copolymers of isobutylene and up to 20 weight % of a para-methylstyrene; and
      (vi) mixtures thereof;
   (b) at least one olefinically unsaturated diene polymer selected from the group consisting of polybutadiene, synthetic polyisoprene, natural rubber, elastomeric copolymers of butadiene with styrene or acrylonitrile, polychloroprene, and mixtures thereof; and
   (c) a compatibilizer for components (a) and (b) comprising a block/graft copolymer of (i) at least one recurring polyisobutylene segment; and
(ii) at least one recurring segment consisting essentially of para-t-butylstyrene.

12. The composition of claim 11 wherein said compatibilizer comprises a tbS-iB diblock copolymer or a tbS-iB-tbS or iB-tbS-iB triblock copolymer having a GPC number average molecular weight in the range of about 10,000 to 500,000 which contains at least about 10 weight % of said para-t-butylstyrene.

13. The composition of claim 11 wherein said components (a) and (b) are present in said composition at a level in the range of about 95–5 parts by weight of (a) per 5–95 parts by weight of (b).

14. The composition of claim 13 wherein said compatibilizer is present in said composition at a level of about 2 to 20 weight % based on the polymer content of said blend.

15. The composition of claim 1 wherein said compatibilizer is a tbS-iB diblock or tbS-iB-tbS triblock copolymer having a GPC number average molecular weight of from about 50,000 to up to about 200,000.

16. The composition of claim 11 wherein said isobutylene polymer (a) comprises a copolymer of isobutylene and para-methylstyrene.

17. The composition of claim 16 wherein said isobutylene polymer (a) is a halogenated copolymer of isobutylene and para-methylstyrene containing benzylic chlorine or bromine.

18. The composition of claim 11 wherein said olefinically unsaturated diene polymer is an elastomer selected from the group consisting of polybutadiene, synthetic polyisoprene, natural rubber, elastomeric copolymers of butadiene with styrene or acrylonitrile, polychloroprene, and mixtures thereof.

19. A vulcanized polymer blend of claim 11.

20. A compatibilized polymer blend comprising:
   (a) an isobutylene polymer selected from:
      (i) polyisobutylene;
      (ii) random copolymers of isobutylene with up to about 10 weight % isoprene;
      (iii) halogenated random copolymers of isobutylene with up to about 10 weight % isoprene;
      (iv) random copolymers of isobutylene with up to 20 weight % of a para-alkylstyrene;
      (v) halogenated random copolymers of isobutylene and up to 20 weight % of a para-alkylstyrene; and
      (vi) mixtures thereof;
   (b) at least one olefinically unsaturated diene polymer; and
   (c) a compatibilizer comprising a copolymer of isobutylene and para-t-butylstyrene, wherein the compatibilizer comprises a tbS-iB diblock copolymer or a tbS-iB-tbS or iB-tbS-iB triblock copolymer having a GPC number average molecular weight in the range of about 10,000 to 500,000 which contains at least about 10 weight % of said para-t-butylstyrene.

21. The composition of claim 20 wherein said components (a) and (b) are present in said composition at a level in the range of about 95–5 parts by weight of (a) per 5–95 parts by weight of (b).

22. The composition of claim 21 wherein said compatibilizer is present in said composition at a level of about 2 to 20 weight % based on the polymer content of said blend.

23. The composition of claim 20 wherein said compatibilizer is a tbS-iB diblock or tbS-iB-tbS triblock copolymer having a GPC number average molecular weight of from about 50,000 to up to about 200,000.

24. The composition of claim 20 wherein said isobutylene polymer (a) comprises a copolymer of isobutylene and para-methylstyrene.

25. The composition of claim 24 wherein said isobutylene polymer (a) is a halogenated copolymer of isobutylene and para-methylstyrene containing benzylic chlorine or bromine.

26. The composition of claim 20 wherein said olefinically unsaturated diene polymer is an elastomer selected from the group consisting of polybutadiene, synthetic polyisoprene, natural rubber, elastomeric copolymers of butadiene with styrene or acrylonitrile, polychloroprene, and mixtures thereof.

27. A vulcanized polymer blend of claim 20.

28. A method of forming a compatibilized polymer blend by combining:
   (a) an isobutylene polymer selected from:
      (i) polyisobutylene;
      (ii) random copolymers of isobutylene with up to about 10 weight % isoprene;
      (iii) halogenated random copolymers of isobutylene with up to about 10 weight % isoprene;
      (iv) random copolymers of isobutylene with up to 20 weight % of a para-alkylstyrene;
      (v) halogenated random copolymers of isobutylene and up to 20 weight % of a para-alkylstyrene; and
      (vi) mixtures thereof;
   (b) at least one olefinically unsaturated diene polymer; and
   (c) a compatibilizer for components (a) and (b) comprising a block/graft copolymer of:
      (i) at least one recurring polyisobutylene segment; and
      (ii) at least one recurring segment consisting essentially of a $C_4$ to $C_6$ alkyl ring substituted styrene or ring-substituted alpha-methylstyrene.

29. The method of claim 28 wherein said compatibilizer comprises a copolymer of isobutylene and para-t-butylstyrene.

30. The method of claim 29 wherein said compatibilizer comprises a tbS-iB diblock copolymer or a tbS-iB-tbS or iB-tbS-iB triblock copolymer having a GPC number average molecular weight in the range of about 10,000 to 500,000 which contains at least about 10 weight % of said para-t-butylstyrene.

31. The method of claim 20 wherein said components (a) and (b) are present in said composition at a level in the range of about 95–5 parts by weight of (a) per 5–95 parts by weight of (b).

32. The method of claim 31 wherein said compatibilizer is present in said composition at a level of about 2 to 20 weight % based on the polymer content of said blend.

33. The method of claim 32 wherein said compatibilizer is a tbS-iB diblock or tbS-iB-tbS triblock copolymer having a GPC number average molecular weight of from about 50,000 to up to about 200,000.

34. The method of claim 28 wherein said isobutylene polymer (a) comprises a copolymer of isobutylene and para-methylstyrene.

35. The method of claim 34 wherein said isobutylene polymer (a) is a halogenated copolymer of isobutylene and para-methylstyrene containing benzylic chlorine or bromine.

36. The method of claim 28 wherein said olefinically unsaturated diene polymer is an elastomer selected from the group consisting of polybutadiene, synthetic polyisoprene, natural rubber, elastomeric copolymers of butadiene with styrene or acrylonitrile, polychloroprene, and mixtures thereof.

37. The method of claim 28, wherein the blend is vulcanized or cured.

* * * * *